(12) United States Patent
Nielsen et al.

(10) Patent No.: US 7,900,152 B2
(45) Date of Patent: Mar. 1, 2011

(54) ADAPTABLE USER INTERFACE FOR BUSINESS SOFTWARE

(75) Inventors: Jakob Nielsen, Redmond, WA (US); Nicholas Justin Lowe, Mercer Island, WA (US); Kevin Honeyman, Fargo, ND (US); Cary Lane Rohwer, Duvall, WA (US); Brian Glaeske, Fargo, ND (US); Hans Roed Mark, Farum (DK); Morten Holm-Petersen, Copenhagen K (DK); Arne de Booij, Copenhagen (DK)

(73) Assignee: Microsoft Corporation, Redmond, WA (US)

( * ) Notice: Subject to any disclaimer, the term of this patent is extended or adjusted under 35 U.S.C. 154(b) by 925 days.

(21) Appl. No.: 11/233,881

(22) Filed: Sep. 23, 2005

(65) Prior Publication Data

US 2006/0200771 A1    Sep. 7, 2006

Related U.S. Application Data

(60) Provisional application No. 60/658,130, filed on Mar. 3, 2005.

(51) Int. Cl.
*G06F 3/048* (2006.01)
(52) U.S. Cl. ..................... 715/764; 715/762
(58) Field of Classification Search ............... 715/762, 715/705, 738, 765, 764, 866, 792
See application file for complete search history.

(56) References Cited

U.S. PATENT DOCUMENTS

| | | | |
|---|---|---|---|
| 5,765,140 A * | 6/1998 | Knudson et al. ............ 705/9 |
| 6,067,548 A | 5/2000 | Cheng |
| 6,101,481 A * | 8/2000 | Miller ........................ 705/9 |
| 6,601,233 B1 | 7/2003 | Underwood |
| 6,678,714 B1 * | 1/2004 | Olapurath et al. ......... 718/104 |
| 6,748,582 B1 * | 6/2004 | Chiles et al. ............... 717/111 |
| 6,797,624 B2 | 9/2004 | Lee |
| 6,850,895 B2 * | 2/2005 | Brodersen et al. ............ 705/9 |
| 6,889,113 B2 | 5/2005 | Tasker et al. |
| 6,944,622 B1 * | 9/2005 | Mitchell et al. ............ 707/102 |
| 6,968,314 B1 * | 11/2005 | White et al. ................. 705/9 |
| 7,113,923 B1 * | 9/2006 | Brichta et al. ............... 705/35 |
| 7,197,740 B2 | 3/2007 | Beringer et al. |

(Continued)

FOREIGN PATENT DOCUMENTS

EP    1 001 337    5/2000

OTHER PUBLICATIONS

Alan Crawford, "Hard Slog Starting to Pay Off for Data Core," The Scotsman, Mar. 4, 1998, p. 1.

(Continued)

*Primary Examiner* — Dennis-Doon Chow
*Assistant Examiner* — Rashawn Tillery
(74) *Attorney, Agent, or Firm* — Theodore M. Magee; Westman, Champlin & Kelly, P.A.

(57) ABSTRACT

An adaptable user interface is formed based on a role assumed by a user and the identification of tasks in a process that need to be performed. For each role assumed by the user, a set of tasks assigned to the role is identified. Each task is evaluated to determine if it is an active task that needs to be performed in one or more processes. For each active task, an element is added to the user interface.

1 Claim, 10 Drawing Sheets

U.S. PATENT DOCUMENTS

| | | | |
|---|---|---|---|
| 7,207,004 B1 | 4/2007 | Harrity | |
| 7,260,510 B2 | 8/2007 | Sumida | |
| 7,308,334 B2 | 12/2007 | Tasker et al. | |
| 7,406,432 B1* | 7/2008 | Motoyama | 705/7 |
| 7,418,448 B2 | 8/2008 | Hensel et al. | |
| 7,463,648 B1 | 12/2008 | Eppstein et al. | |
| 7,484,183 B2 | 1/2009 | Look et al. | |
| 7,516,110 B2 | 4/2009 | Spector et al. | |
| 7,548,925 B2 | 6/2009 | Bradlee et al. | |
| 7,610,575 B2 | 10/2009 | Sproule | |
| 7,640,548 B1* | 12/2009 | Yu et al. | 718/106 |
| 7,703,102 B1 | 4/2010 | Eppstein et al. | |
| 2002/0165898 A1* | 11/2002 | Duffy et al. | 709/102 |
| 2003/0204431 A1* | 10/2003 | Ingman | 705/9 |
| 2004/0078776 A1* | 4/2004 | Moon et al. | 717/101 |
| 2004/0133876 A1 | 7/2004 | Sproule | |
| 2005/0091093 A1 | 4/2005 | Bhaskaran et al. | |
| 2005/0091260 A1* | 4/2005 | Carroll et al. | 707/102 |
| 2005/0198209 A1* | 9/2005 | Barrett | 709/219 |
| 2005/0209900 A1 | 9/2005 | Kettner et al. | |
| 2005/0278655 A1* | 12/2005 | Sims | 715/792 |
| 2006/0047723 A1 | 3/2006 | Pomponio | |
| 2006/0085747 A1 | 4/2006 | Morgan | |
| 2006/0200476 A1 | 9/2006 | Gottumukkala et al. | |
| 2006/0200489 A1 | 9/2006 | Lowe et al. | |
| 2006/0203849 A1* | 9/2006 | Bonar et al. | 370/473 |

OTHER PUBLICATIONS

Procession, "Procession Business Process Application Platform 'Quick Start' Guide," pp. 1-59. (Date Unknown).

Procession—Exposure of the Global Stage 1196-2000 A Brief Resume by Procession CEO 1995-2000, 1 page. (Date Unknown).

Procession, Delivers Performance Management Through a Process Application Development Platform, 1 page, Dec. 2004.

Mark Smith, Ventana Research, "Procession Drives a Process of Change for Business," Jan. 24, 2004, Article ID: M04-04, pp. 1-2.

Michael Thompson, "Business Process Management Technology Audit, Procession," Butler Group Subscription Services, Apr. 2004, pp. 1-8.

Andy Kellett, "Business Process Management Research Paper, Procession V4.1," Research and Advisory Services, Mar. 2004, pp. 1-8.

Procession, Process Management for the E-World, pp. 1-4. (Date Unknown).

Procession, Grant Management System, pp. 1-4. (Date Unknown).

Datacore Procession, "The Next Generation of Business Software," 1 page (Date Unkown).

Procession, "Procession Business Process Application Platform 'Quick Start' Guide," pp. 1-59. (Date Unknown).

Procession, The Business Process System, Datacore, pp. 1-4. (Date Unknown).

Andy Kellett, "Business Process Management Research Paper, Procession V4.1," Research and Advisory Services, Mar. 2002, pp. 1-8.

Collins et al., DataCore, "DataCore Limited rquirement Specification for Procession the Windows ProcessFlow Product," Issue 1.0, pp. 1-37 Feb. 27, 1996.

"Conspectus—The It Report for Decision Makers and Consultants," Conspectus Sep. 1997, 2 pages.

Michael C. Greenbaum of Blank Rome LLP, "Prior Work by Others Relevant to Microsoft Patent Applications." Sep. 2, 2008, 2 pages.

Prosecution Documents Associated with U.S. Appl. No. 11/287,547 including: Amendment filed Mar. 8, 2010 Office Action mailed Dec. 30, 2009 Amendment with RCE filed Dec. 3, 2009 Final Office Action mailed Aug. 18, 2009.

Prosecution Documents Associated with U.S. Appl. No. 11/345,965 including: Office Action mailed Mar. 24, 2010 Response to Restriction Requirement filed Feb. 12, 2010 Restriction Requirement mailed Jan. 14, 2010.

Dewan, Rajiv et al. Workflow Optimization Through Task Redesign in Business Information Processes, International Conference on System Sciences, 1998.

Anders, Morch, Tailoring tools for system development, Journal of End User Computing, vol. 10, No. 2, Spring 1998.

Harrington, James H., Business Process Improvement Workbook, McGraw-Hill, 1997, ISBN: 0-07-026779-0.

Tatsiopoulous, I.P., Requirements Analysis of Production Managmenet Software Systems, Computer Integrated Systems, vol. 3, No. 4, Nov. 1990, Abstract.

Cheong, Yu Chye et al., Frame-based Method for Customizing Generic Software Architectures, ACM, SSR'99, 1999.

Microsoft Solutions Framework—White Paper, Microsoft, Jun. 2002.

Prosecution Documents Associated with U.S. Appl. No. 11/287,547 including: Final Office Action mailed Jun. 10, 2010.

* cited by examiner

FIG. 9

ADAPTABLE USER INTERFACE FOR BUSINESS SOFTWARE

REFERENCE TO RELATED APPLICATIONS

The present application claims priority benefit to U.S. Provisional Application 60/658,130 filed on Mar. 3, 2005.

BACKGROUND

Business software applications are designed to allow users to perform a number of tasks. In general, user interfaces for these applications are fixed such that for a particular user, the interface always contains the same controls and types of information. As a result, user interfaces tend to provide too many controls and too much information because the designers need to provide access to all of the controls the user may need. This results in a confusing using interface that includes too much information for the user and does not provide the user with guidance as to which tasks should be completed next.

The discussion above is merely provided for general background information and is not intended to be used as an aid in determining the scope of the claimed subject matter.

SUMMARY

An adaptable user interface is formed based on a role assumed by a user and the identification of tasks in a process that need to be performed. For each role assumed by the user, a set of tasks assigned to the role is identified. Each task is evaluated to determine if it is an active task that needs to be performed in one or more processes. For each active task, an element is added to the user interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 9 provides an example of a task user interface.

DETAILED DESCRIPTION

Figure 1:
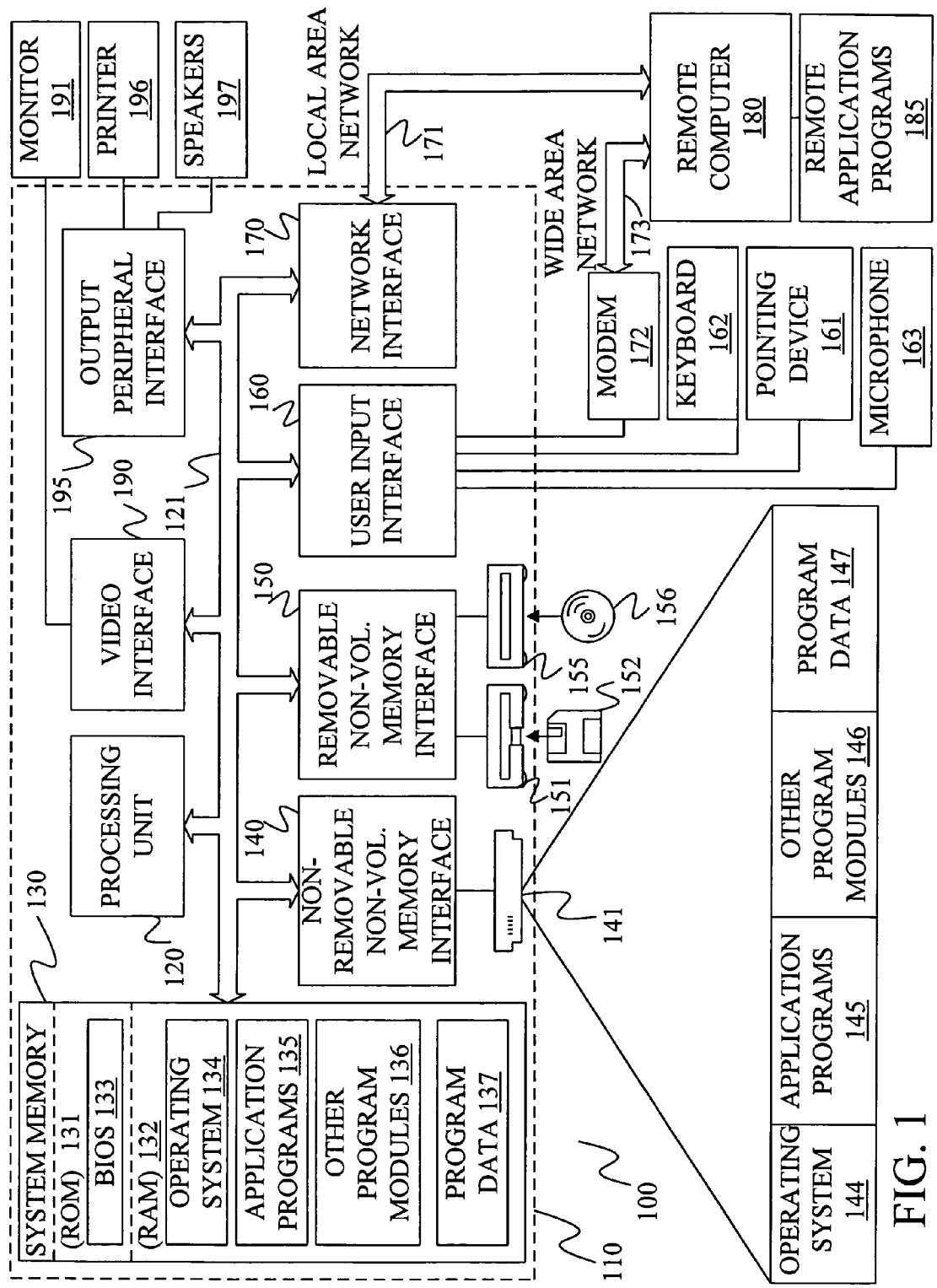
FIG. 1 is a block diagram of one computing environment in which some embodiments of the present invention may be practiced.

FIG. 1 illustrates an example of a suitable computing system environment 100 on which embodiments may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing some embodiments includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
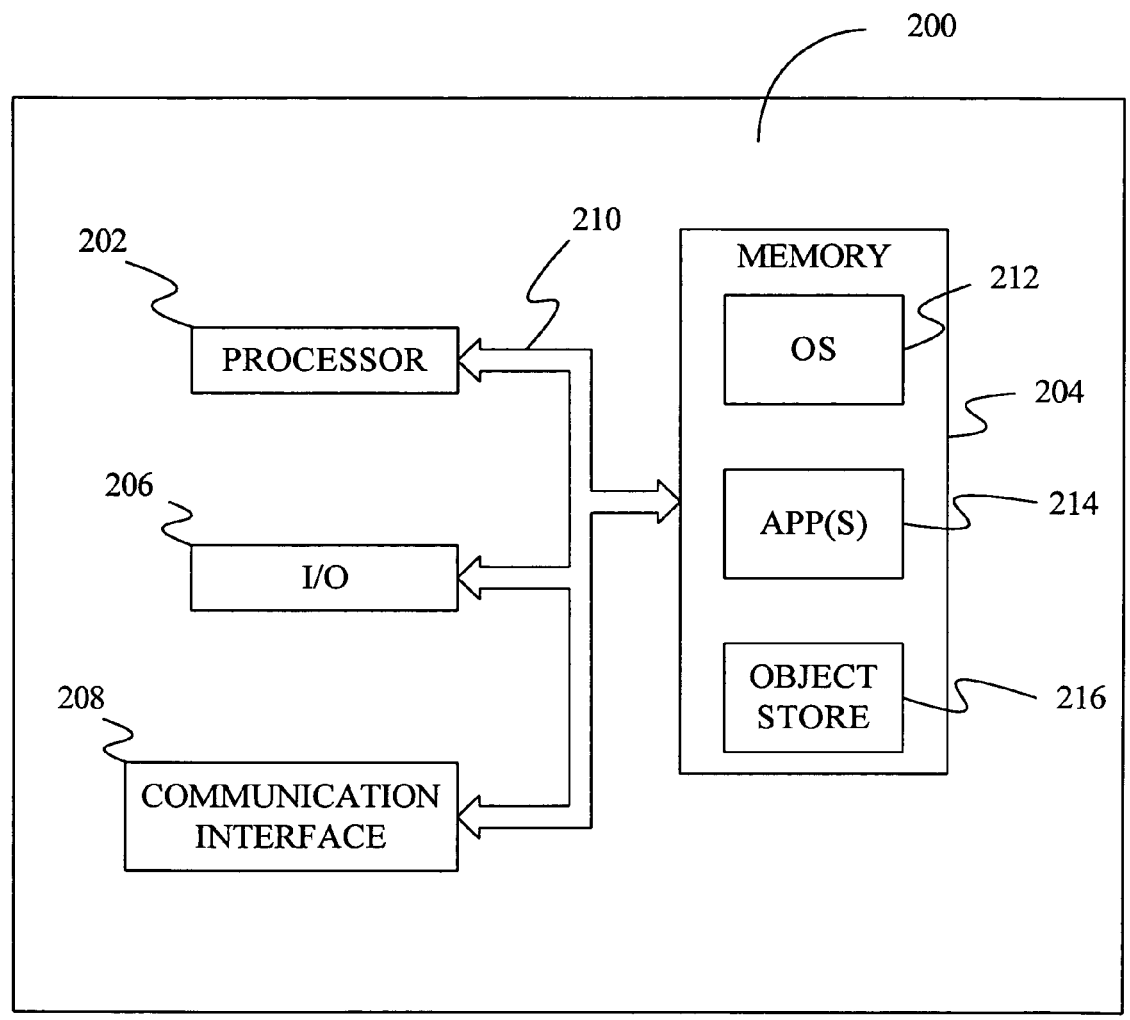
FIG. 2 is a block diagram of an alternative computing environment in which some embodiments of the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

A customer model is used to associate tasks in a process with users in an organization. Using these associations and keeping track of progress through the processes, a user interface is adapted to provide a user with those tasks that are relevant to the user while suppressing those tasks that are either not performed by the user, or are not available given the progress through the process.

Figure 3:
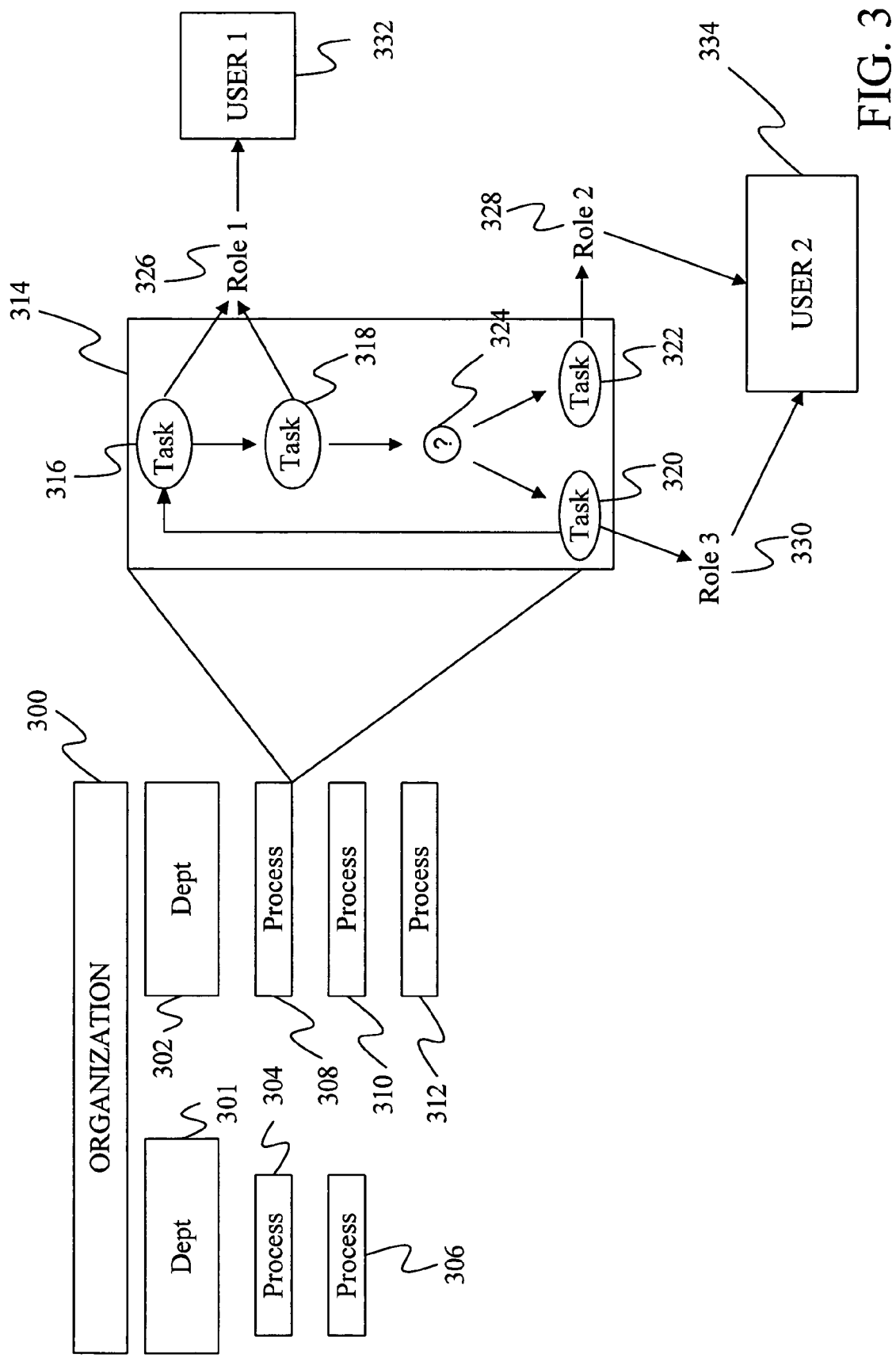
FIG. 3 is a block diagram of a customer model under one embodiment of the present invention.

FIG. 3 provides a block diagram of a customer model. In the customer model, an organization 300 is divided up into departments such as departments 301 and 302. Within each department, a set of processes such as processes 304, 306, 308, 310 and 312 are identified. Each process consists of a flow of tasks such as task flow 314 consisting of tasks 316, 318, 320 and 322 and decision points such as decision point 324.

Each task in each process is assigned to a role, where a single role may encompass multiple tasks. For example, role 326 is responsible for performing tasks 316 and 318. Role 328 and 330 perform tasks 322 and 320, respectively.

Each user in the organization such as users 332 and 334 assume one or more roles. For instance, user 332 assumes role 236 and user 334 assumes roles 328 and 330. Through the assumption of these roles, each user is assigned the tasks associated with those roles by default. As discussed further below, this default assignment of tasks can be modified through user-specific settings.

Figure 4:
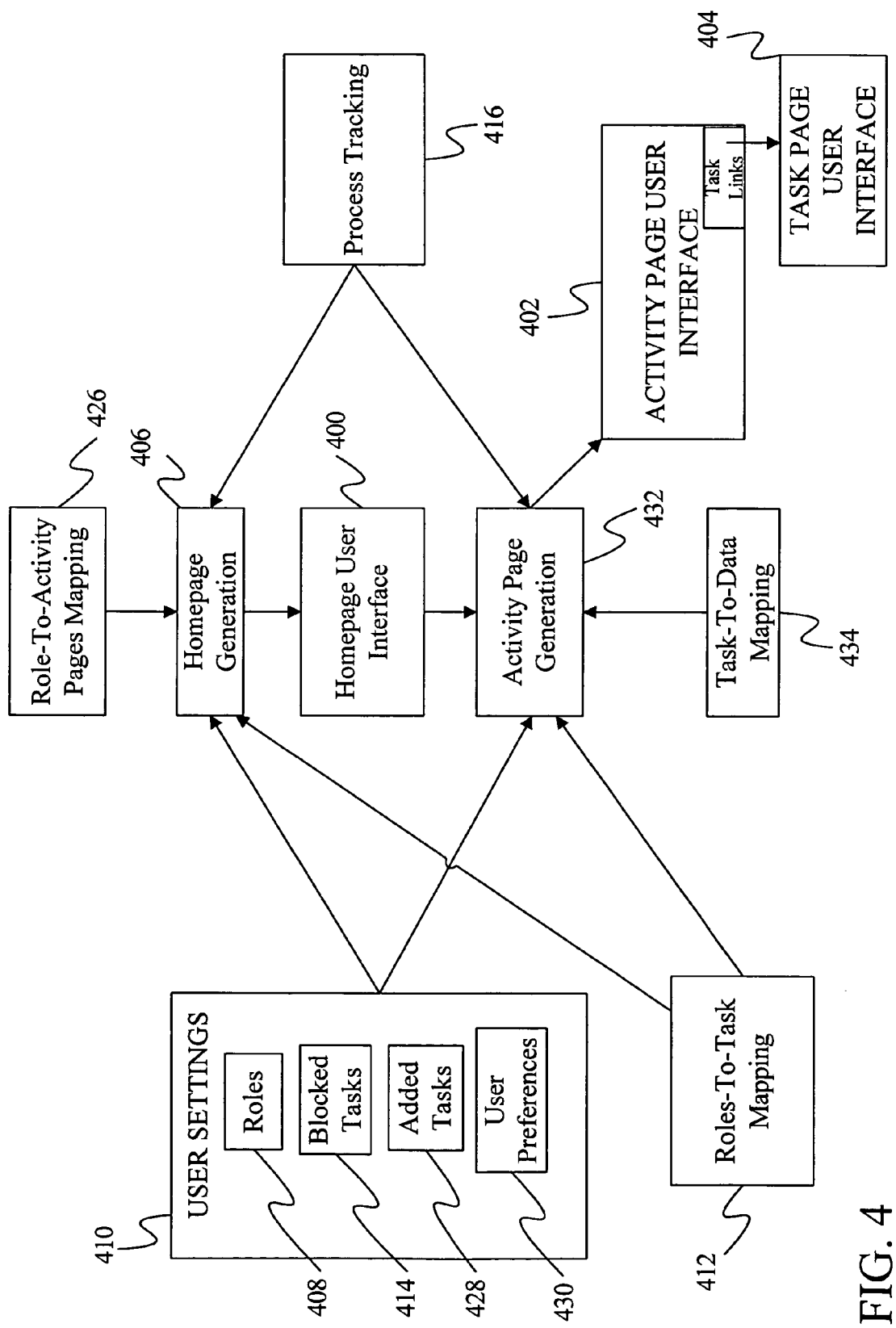
FIG. 4 provides a block diagram of elements used to construct an adaptable user interface.
Figure 5:
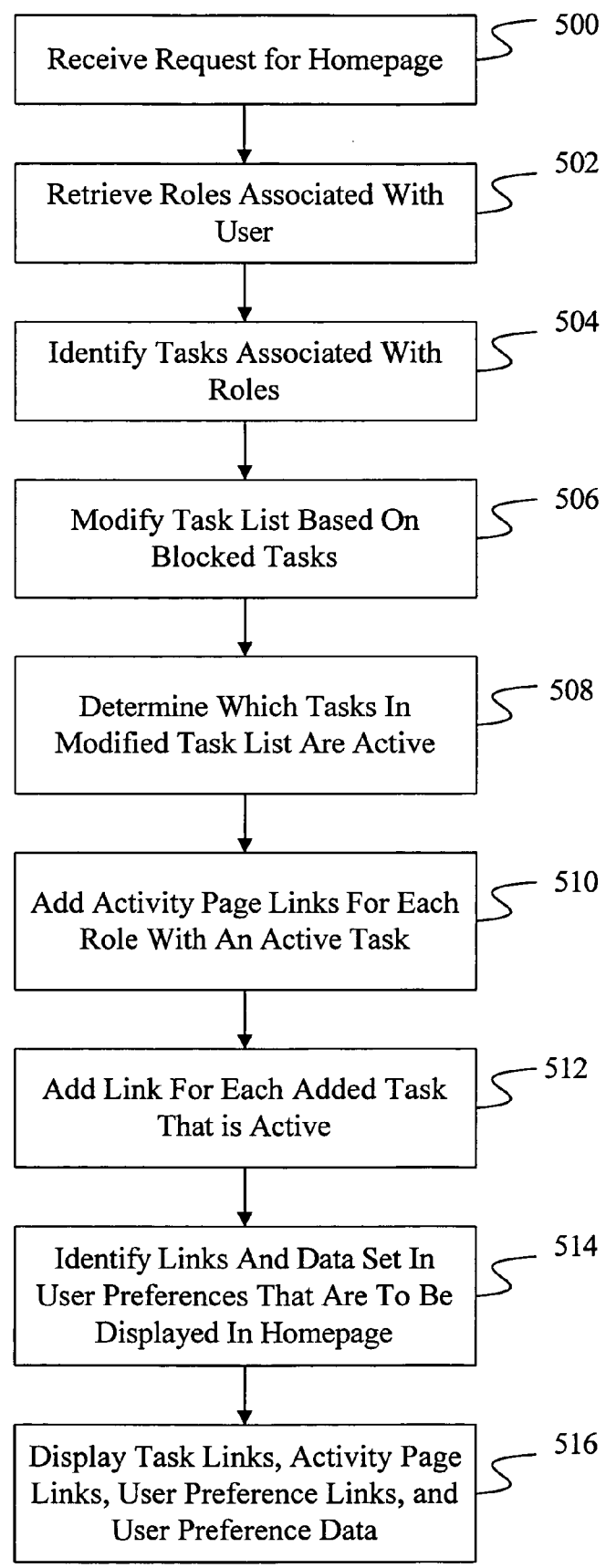
FIG. 5 provides a flow diagram for constructing an adaptable homepage user interface.

FIG. 4 provides a block diagram of elements that utilize the roles and processes of the customer model to form adaptable user interfaces. In the embodiment of FIG. 4, a homepage user interface 400 activity page user interface 402 and task page user interface 404 are generated. FIG. 5 provides a flow diagram of a method for generating homepage user interface 400.

In step 500, a request to display a homepage is received. This request includes an identification of the user for whom the homepage is being generated. At step 502, a homepage generation unit 406 retrieves roles 408 stored in user settings 410 that have been associated with the user. At step 504, homepage generation unit 506 identifies tasks associated with the roles using roles-to-task mapping 412. Roles-to-task mapping 412 provides a list of the tasks that have been associated with a role in the customer model.

At step 506, the task list created from the roles is modified based on a set of blocked tasks 414 in user settings 410. Blocked tasks are tasks that would normally be assigned to the user based on their roles but that are blocked based on the skill level of the user or based on the size of the department or organization. For instance, in very large organizations, tasks tend to be more specialized so that a group of tasks that are placed within a role may be divided among several users that assume the role. For example, if a role contained two tasks, one user who assumes the role may perform the first task while another user who also assumes the role may perform the second task.

At step 508, homepage generation unit 406 determines which tasks in the modified task list are active. This determination is made by consulting process tracking 416, which lists tasks that need to be performed. Process tracking 416 updates the tasks that need to be performed by removing tasks after they are performed and adding the next task in the process description. Tasks do not become active until they can be performed. Thus, if other tasks must be performed or some information is needed before a task can be performed, it would not be designated as an active task by process tracking 416.

At step 510, homepage generation 406 adds activity page links to the homepage user interface for each of the user's roles that have at least one active task. Each activity page is associated with a particular role in a role-to-activity page mapping 426. An activity page is a user interface that displays a set of tasks or links to a set of tasks that are associated with a role.

At step 512, homepage generation 406 adds links for each of a set of added tasks 428 that are found in user settings 410 and that are active. Added task 428 represents tasks outside of the roles that have been assigned to the user. These added tasks can be temporary tasks that have been assigned to the user to overcome a change in personnel or can be a tailored modification that assigns a task normally associated with another role to a particular user who does not assume that role.

At step 514, homepage generation 406 consults user preferences 430 to identify links and data that the user has requested be displayed in their homepage. The data displayed can include key performance indicators related to the roles assumed by the user as well as key performance indicators that the user finds interesting but that are not normally associated with their roles.

At step 516, homepage generation 406 generates homepage user interface 400 by displaying the task links, the activity page links, the user preference links, and the user preference data.

Figure 6:
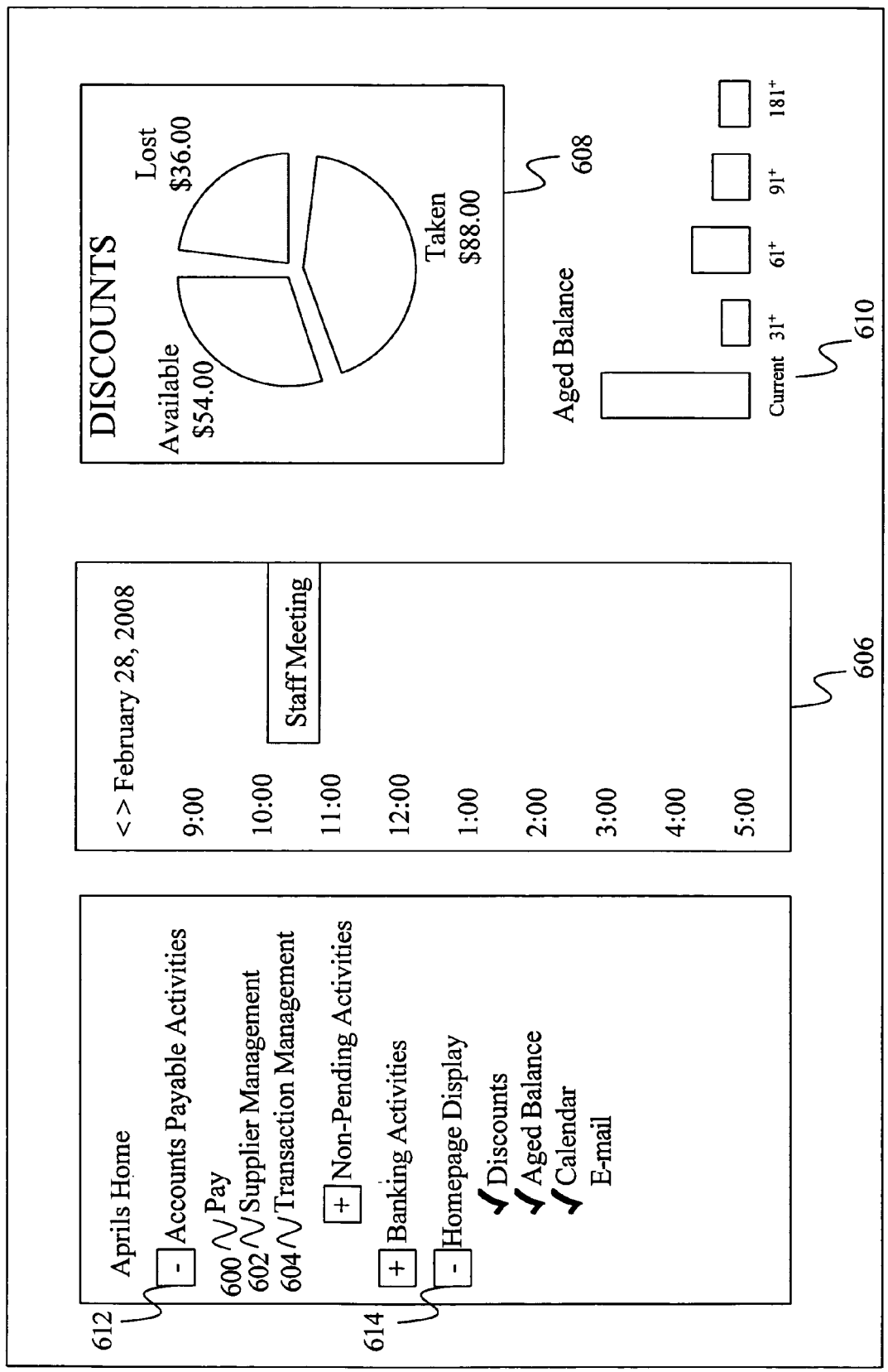
FIG. 6 provides an example of an adaptable homepage user interface.

FIG. 6 provides an example of an adaptable homepage. In FIG. 6, activity page links 600, 602 and 604 are provided. In addition, user preference calendar data 606, discounts data 608 and aged balance data 610 are displayed. The activities links are displayed beneath department activity headers such as accounts payable activities header 612 and banking activities header 614 (which is not expanded in the example of FIG. 6). By clicking on one of links 600, 602 or 604, the user is able to request the display of the respective activity page.

Under various embodiments, each activity page is also an adaptable user interface that has its contents change depending on the roles performed by the user, the user's preferences, and the stage of various processes that the user is involved with. In FIG. 4, an activity page generation unit 432 generates activity pages 402 using the process shown in FIG. 7.

Figure 7:
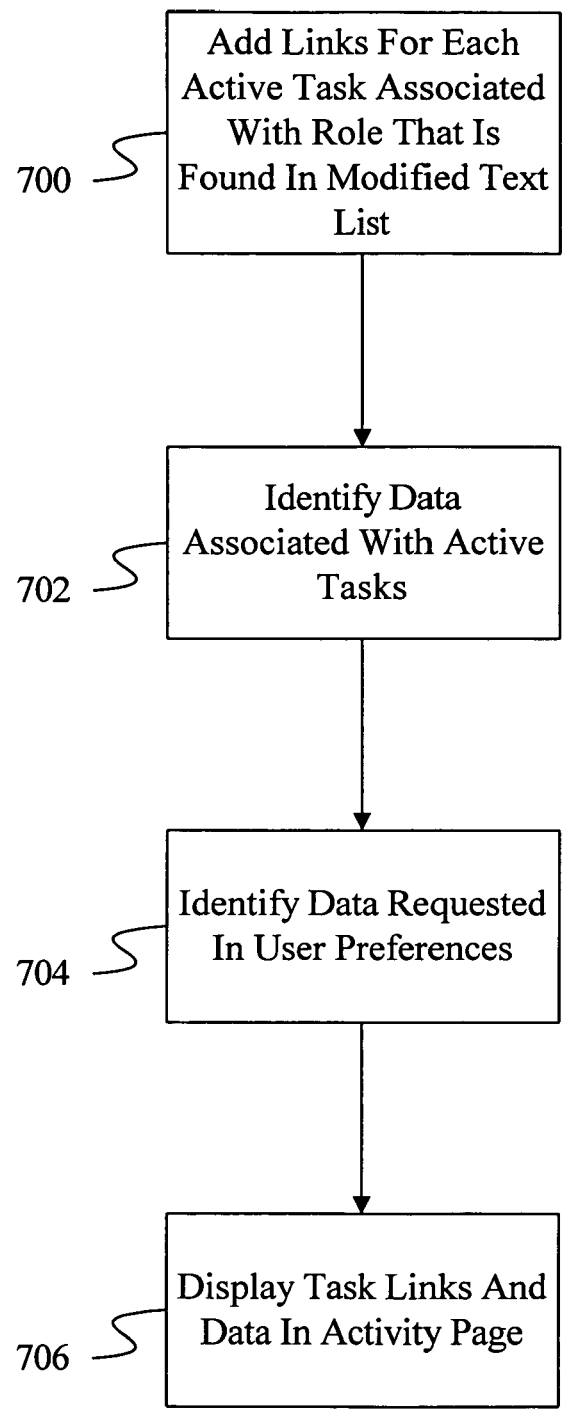
FIG. 7 provides a flow diagram for generating an adaptable activities page user interface.

In step 700 of FIG. 7, activity page generation unit 432 adds links for each active task associated with the role for this activity page. Under some embodiments, the active tasks are those tasks found in the modified task list at step 508 for the current role.

At step 702, activity page generation unit 432 identifies data associated with the active tasks. This can be done by consulting a task-to-data mapping 434 of FIG. 4. At step 704, activity page generation unit 432 consults user preferences 430 to identify data that the user has indicated they want displayed in the activity page for this role.

At step 706, activity page generation unit 432 displays activity page 402 by displaying all of the task links for the active tasks associated with the role and the data associated with those tasks and the data requested in the user preferences. In other embodiments, instead of providing task links in the activity page, task areas are provided in which the user may perform the task without opening another page.

Figure 8:
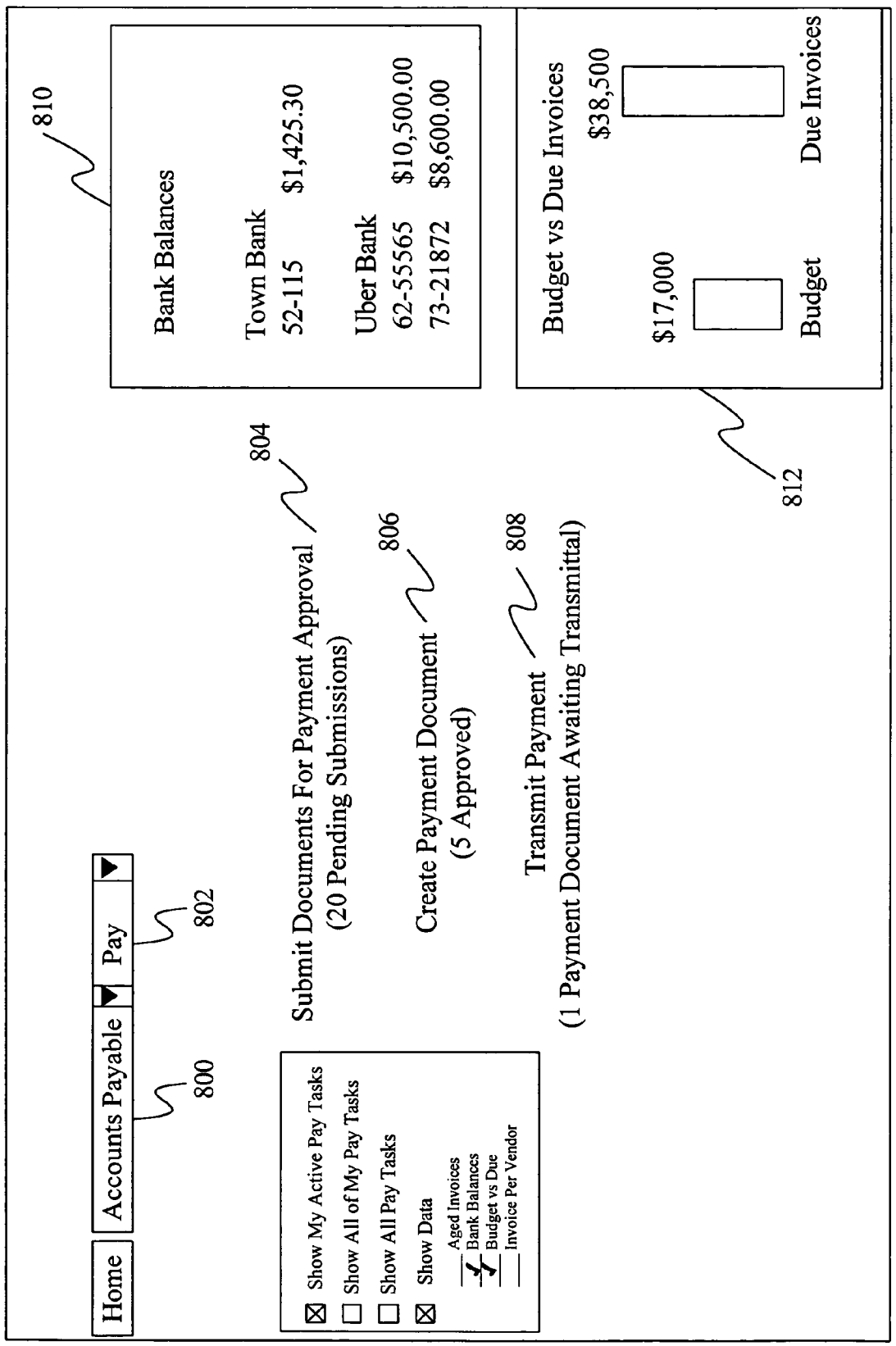
FIG. 8 provides an example of an activity page user interface.

FIG. 8 provides an example of an activity page for a "pay" role in an "accounts payable" department. In the activity page of FIG. 8, a department pull-down selection box 800 and a role pull-down selection box 802 are provided that allow the user to move to other departments and other activity pages. In FIG. 8, links 804, 806 and 808 are provided which link to active tasks identified for the "pay" role. Link 804 is for the "submit documents for payment approval" task and indicates that there are twenty pending documents for submission. Link 806 is for the "create payment document" task and indicates that there are five invoices that have been approved for payment. Link 808 is for the "transmit payment task" and indicates that one payment document awaits transmittal.

The activity page of FIG. 8 also includes bank balances data 810 and budget versus due invoices data 812. Bank balances data 810 and budget versus due invoices data 812 are associated with the submit documents for payment approval task.

Because the activity page of FIG. 8 only provides links for active tasks, the user is not distracted by tasks that do not require their attention. Further, since the tasks presented in the activity page are determined from the stages of various processes, the user does not have to remember the sequences of the processes. Instead, the user can simply view the active tasks and know which tasks need to be performed.

Figure 9:
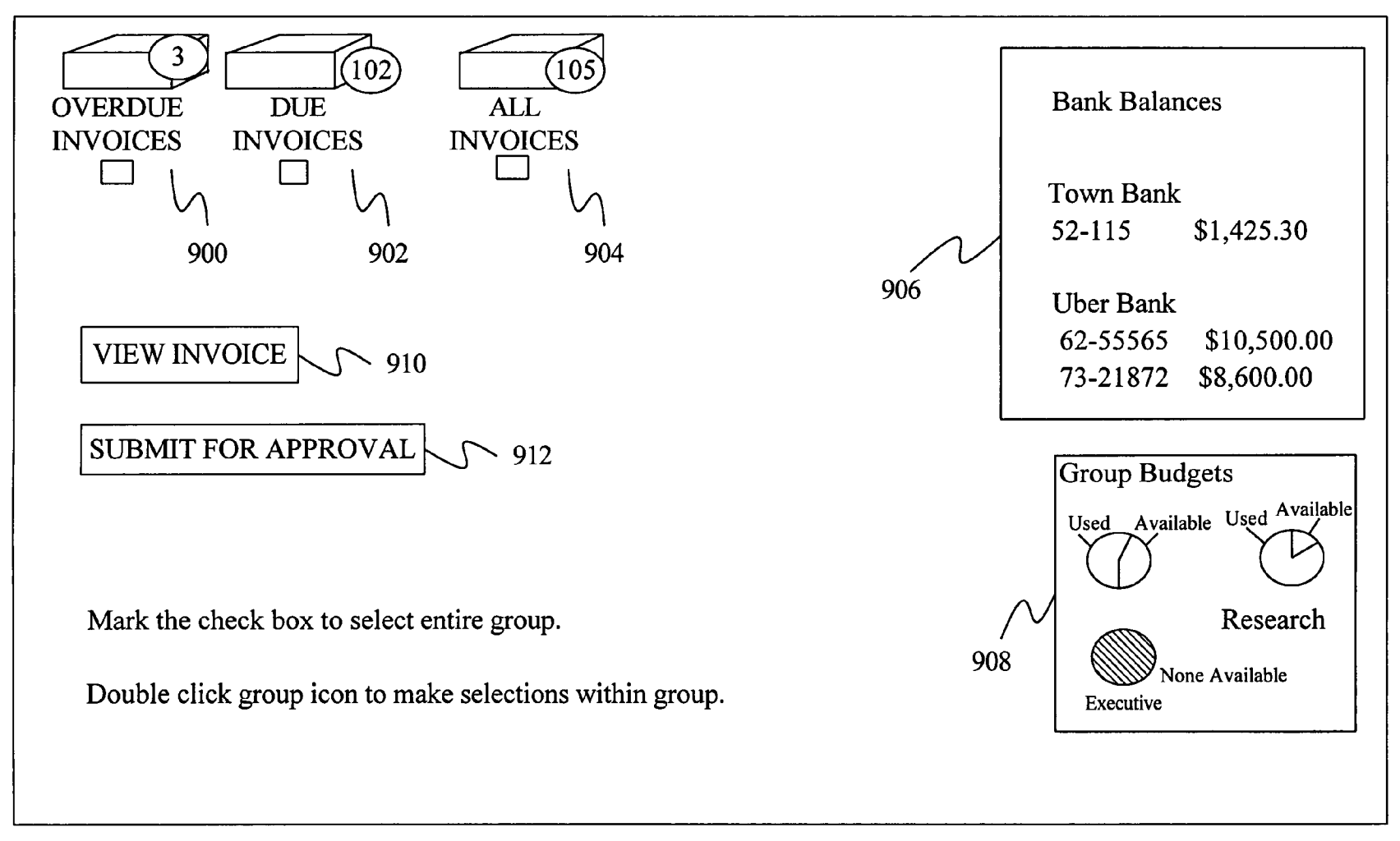

Selecting one of the task links causes a task user interface to be shown such as the task user interface of FIG. 9, which is the "submit documents for payment approval" task user interface. The task user interface includes data and control buttons that can be used to perform a task. For example, in FIG. 9, invoices are broken into overdue invoices 900, due invoices 902 and all invoices 904. The user may select one of these groups of invoices by clicking on a check box below the group. The user may also expand each group to select individual invoices in the group by double clicking on the group. Once an invoice or group of invoices is selected, the selected invoice(s) may be viewed using "view invoice" control button 910 or the selected invoices may be submitted for approval using "submit for approval" button 912. In addition, the task page of FIG. 9 provides bank balances data 906 and group budgets data 908, which help the user to decide which invoices to submit for approval.

After the user has submitted invoices for approval, process tracking unit 416 will update its process data for the invoices that were submitted for approval and advance them to the next task in the process.

Because the user interfaces are adapted based on a stage of processing, the user interfaces are driven by the process definitions. If a task is deleted from a process, the task will be omitted from the activity page automatically since process tracking 416 will never indicate that the deleted task is active. If tasks are reorganized such that a task is moved from one role to another, the user interfaces for the users associated with those roles will automatically be updated. For example, a user who loses a task under one of their roles will have that task automatically deleted from the activity page since roles-to-task mapping 412 will no longer indicate that this is a possible task to be displayed in an activity page. For the user that gained a task in one of the roles, role-to-task mapping 412 will now show this as a possible task for that role.

Figure 10:
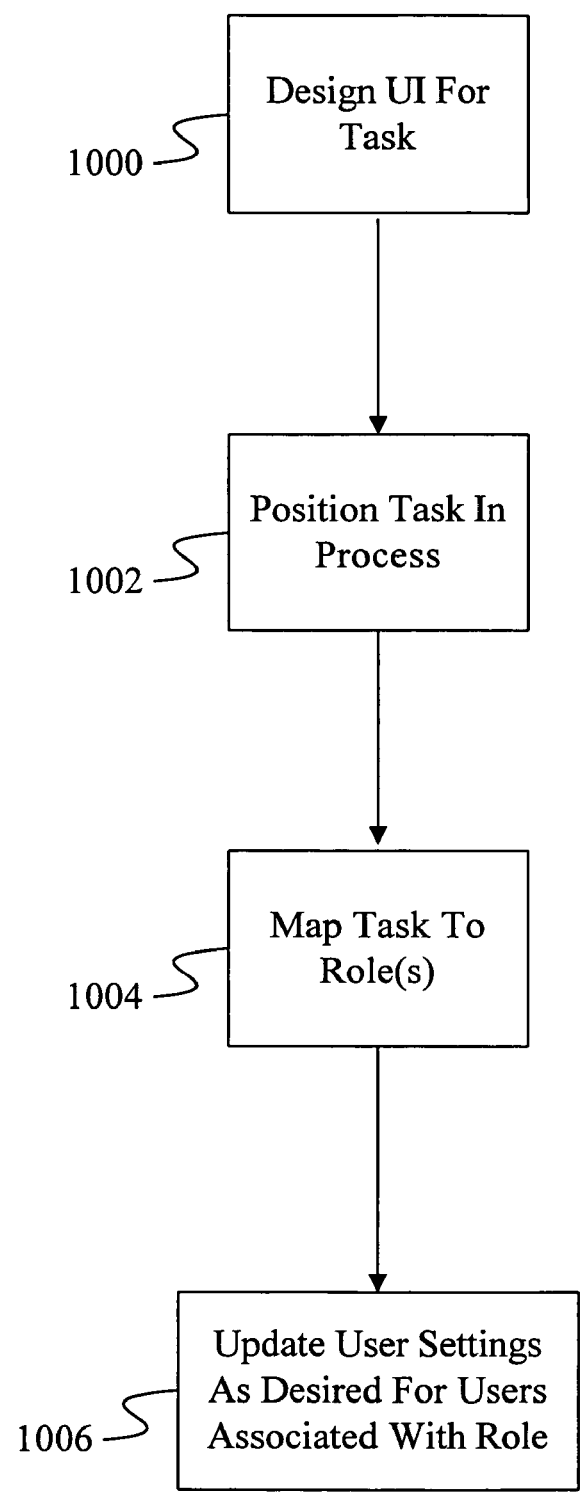
FIG. 10 provides a flow diagram of a method of adapting a user interface based on a change in a process.

The present invention also permits easy integration of new tasks into processes. FIG. 10 provides a flow diagram for adding a user interface for a new task in a process.

At step 1000 of FIG. 10, the user interface for the task is designed. At step 1002, the task is positioned in one or more processes. At step 1004, the task is mapped to one or more roles and at step 1006, user settings are updated as desired for users associated with the role(s) to either allow the role to dictate that the task appears or to block the task for particular users.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving a request to display a homepage user interface for a user;
   a processor identifying a plurality of roles currently assigned to the user;
   a processor forming a task list by identifying all tasks assigned to each of the plurality of roles assigned to the user;
   modifying the task list by removing at least one task from the task list to form a modified task list;
   for each of the plurality of roles assigned to the user, a processor determining whether at least one task in the modified task list is active such that at least two of the plurality of roles assigned to the user have at least one task that is active;
   for each of the plurality of roles that has at least one active task, a processor adapting a homepage user interface by displaying a respective link in the homepage user interface, wherein each respective link may be selected to retrieve a respective activity page, and wherein each activity page is associated with a particular role in a role-to-activity page mapping such that each activity page displays active tasks or links to active tasks that are associated with the particular role associated with the activity page while suppressing those tasks that are not available given progress through a process;
   consulting user preferences to identify data that the user has requested be displayed in their homepage, the data comprising for each of the plurality of roles assigned to the user, key performance indicators related to the roles and key performance indicators that are not normally associated with the user's roles; and
   displaying the data in the homepage user interface.

* * * * *